United States Patent [19]

Sakakibara

[11] Patent Number: 4,541,820
[45] Date of Patent: Sep. 17, 1985

[54] V-BELT TYPE STEPLESS TRANSMISSION

[75] Inventor: Shiro Sakakibara, Anjo, Japan

[73] Assignee: Aisin-Warner Limited, Anjo, Japan

[21] Appl. No.: 554,732

[22] Filed: Nov. 23, 1983

[30] Foreign Application Priority Data

Nov. 27, 1982 [JP] Japan .............................. 57-208146

[51] Int. Cl.⁴ .............................................. F16H 11/06
[52] U.S. Cl. ........................................... 474/17; 474/8
[58] Field of Search .......................... 474/17, 28, 8, 11

[56] References Cited

U.S. PATENT DOCUMENTS 2,623,410 12/1952 Billey ................................. 474/17 X
3,771,377 11/1973 Bush ...................................... 474/17

FOREIGN PATENT DOCUMENTS 1525013 8/1965 Fed. Rep. of Germany ........ 474/17

*Primary Examiner*—James A. Leppink
*Assistant Examiner*—Frank H. McKenzie, Jr.
*Attorney, Agent, or Firm*—Pahl, Lorusso & Loud

[57] ABSTRACT

A V-belt type stepless transmission, comprising: an input pulley and an output pulley mounted on parallel input and output shafts, respectively, each pulley having a stationary flange and a movable flange axially displaceable relative to the stationary flange and rotatable integrally therewith; an endless V-belt lapped around the input and output pulleys to transmit power therebetween, a servo mechanism for the movable flange, including a drive member having a first screw or a second screw, the first screw formed on the movable flange or on a structure integrally connected to the movable flange, the second screw threadedly engaged with the first screw for axially displacing the movable flange by rotation of the second screw relative to the first screw, and a brake provided between the drive member and a transmission case for braking the drive member, and a torsion spring interposed between the movable flange and the drive member; and a cam mechanism provided at least on one of the input and output shafts to vary the belt gripping force of the stationary and movable flanges in proportion to the torque transmitted by the V-belt.

1 Claim, 7 Drawing Figures

V-BELT TYPE STEPLESS TRANSMISSION

BACKGROUND OF THE INVENTION (i) Field of the Invention:

This invention relates to a stepless transmission using a V-belt.

(ii) Description of the Prior Art

In conventional V-belt type stepless transmission, changes in gear ratio (or reduction ratio) as well as increments or decrements in the compressive belt gripping force of pulleys are usually controlled by hydraulic pressure. However, since this sort of hydraulic control is restricted by the cylinder volume of a hydraulic servo and the minimum oil pressure as required in other parts of a hydraulic circuit, it has been difficult to change the belt gripping force precisely according to variations in transmitted torque. Therefore, when used as a transmission of a motor vehicle or the like which involves large variations in torque, an unduly large contact pressure is often imposed on the friction surfaces of the pulleys and the V-belt, shortening their service life and lowering the efficiency of power transmission.

SUMMARY OF THE INVENTION

Accordingly, it is an object of the present invention to provide a V-belt type stepless transmission which is capable of precisely controlling the compressive belt gripping force of pulleys in proportion to transmitted torque in order to improve the service life of the pulleys and the V-belt and to increase the power transmission efficiency.

It is another object of the present invention to provide a V-belt type stepless transmission which is significantly simplified in the construction of the servo mechanism for the movable flanges.

According to the present invention, there is provided a V-belt type stepless transmission which basically comprises: an input pulley and an output pulley mounted on parallel input and output shafts, respectively, each pulley having a stationary flange and movable flange axially displaceable relative to the stationary flange and rotatable integrally therewith; an endless V-belt lapped around the input and output pulleys to transmit power therebetween; a servo mechanism for the movable flange, including a drive member having a first screw or a second screw, the first screw formed on said movable flange or on a structure integrally connected to said movable flange, the second screw threadedly engaged with said first screw for axially displacing said movable flange by rotation of said second screw relative to said first screw, and a brake provided between said drive member and a transmission case for braking said drive member, and a torsion spring interposed between said movable flange and said drive member; and a cam mechanism provided at least on one of the input and output shafts to vary the belt gripping force of the stationary and movable flanges in proportion to the torque transmitted by the V-belt.

The above and other objects, features and advantages of the present invention will become apparent from the following description and appended claims, taken in conjunction with the accompanying drawings which show by way of example some illustrative embodiments of the invention.

DESCRIPTION OF PREFERRED EMBODIMENTS

Figure 1:
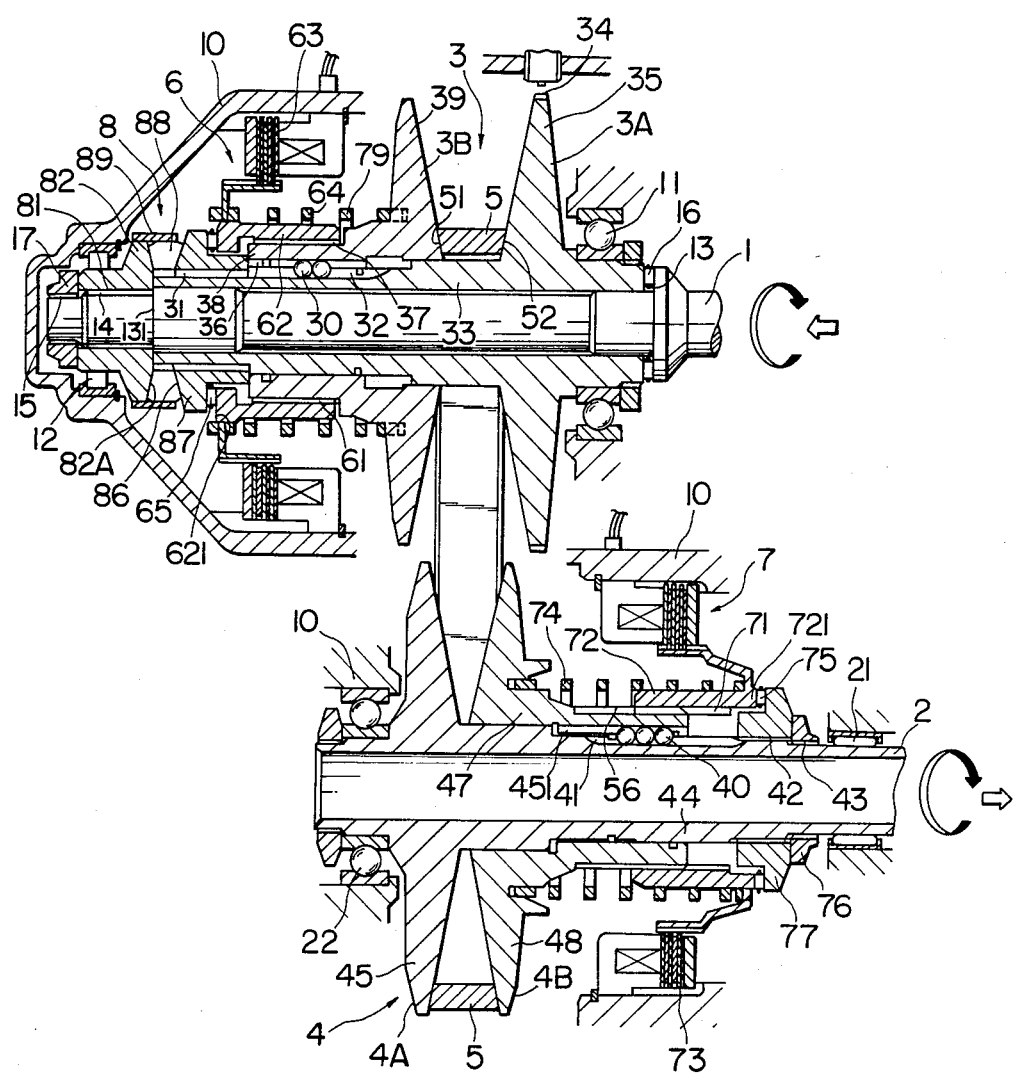
FIG. 1 is a schematic sectional view of a V-belt type stepless transmission in a first embodiment of the present invention.

Referring to the accompanying drawings and first to FIG. 1, there is shown a V-belt type stepless transmission embodying the present invention, including an input shaft 1, an output shaft 2 disposed parallel with the input shaft 1, an input pulley 3 which is mounted on the input shaft 1, an output pulley 4 which is mounted on the output shaft 2, an endless V-belt lapped around the input and output pulleys 3 and 4 to transmit power therebetween, a servo mechanism 6 which serves to vary the effective diameter of the input pulley 3, and a servo mechanism 7 which serves to vary the effective diameter of the output pulley 4, and a cam mechanism 8 which is provided on the input pulley 3.

The input shaft 1 is rotatably supported in a V-belt type stepless transmission case 10 through bearings 11 and 12, and provided with a stepped portion 13 and a spline 14 on its circumference along with a screw 15 tapped at its fore end.

In the particular embodiment shown in FIG. 1, the output shaft 2 is formed integrally with a sleeve portion of a stationary flange which will be described below, and rotatably supported in the transmission case 10 through bearings 21 and 22.

The input pulley 3 includes: a stationary flange 3A having a sleeve-like portion 33 which is abutted at one end (the right end in the figure) against the stepped portion 13 of the input shaft 1 through a thrust bearing 16 and, on the outer periphery at the other end, provided with a spline 31 and a key way 32, and a flange portion 35 which is formed integrally with the sleeve-like portion 33 and provided with slits 34 on its outer periphery for the detection of rotational speed of the input shaft 1; a movable flange 3B including a sleeve-like hub portion 38 axially displaceably fitted on the sleeve 33 of the stationary flange 3A and provided on its inner periphery with a key way 36 matching the key was 32 on the stationary flange 3A and on its outer periphery with a first or driven screw 37, and a flange portion 39 formed integrally with the hub portion 38; and a ball key 30 received in the key ways 32 and 36 to permit axial displacements of the stationary and movable flanges 3A and 3B as well as integral rotation about the axes thereof.

The output pulley 4 includes: a stationary flange 4A having a flange portion 45 and a sleeve-like portion 44 which is integrally formed with the flange portion 45 and is provided on its outer periphery with a key way 41, a spline 42 and a screw 43 and formed integrally with the output shaft 2; a movable flange 4B including a sleeve-like hub portion 47 which is axially displaceably fitted on the sleeve 44 of the stationary flange 4A and provided on its inner periphery with a key way 451 matching with the key way 41 and on its outer periphery with a first or driven screw 56, and flange portion 48 which is formed integrally with the sleeve-like hub portion 47; and a ball key 40 received in the key ways 41 and 451 to permit integral rotation of the stationary and movable flanges 4A and 4B.

The V-belt 5 is provided with operating surfaces 51 and 52 at the opposite sides thereof, providing friction surfaces to be engaged with V-shaped operating surfaces which are formed by the stationary flanges 3A and 4A and movable flanges 3B and 4B of the input and output pulleys 3 and 4.

The servo mechanism 6 of the input pulley 3 includes: a sleeve 62 serving as a drive member of the movable flange 3B, having a second or drive screw 61 on its outer periphery threadedly engaged with the driven screw 37 of the movable flange 3B and abutted at one end 62 1 against the other end of a cam race 87 which will be described below, through a thrust bearing 65; a wet type electromagnetic multidisc downshift brake 63 provided between the sleeve 62 and transmission case 10 for holding the sleeve 62 stationary; and an upshift spring 64 having the opposite ends thereof secured to the movable flange 3B and sleeve 62.

The servo mechanism 7 of the output pulley 2 includes: a sleeve 72 serving as a drive member having a second or drive screw 71 on its inner periphery threadedly engaged with the driven screw 56 of the movable flange 4B; a wet type electromagnetic multidisc upshift brake 73 for fixing the sleeve 72 relative to the transmission case 10; a downshift torsion coil spring 74 having the opposite ends thereof securely connected to the sleeve 72 and movable flange 4B; and a support ring 77 provided with a spline for fitting engagement with the spline 42 of the output shaft and having one face on the side of the movable flange 4B abutted against an end face 721 of the sleeve 72 through a bearing 75 and the other face stopped by a nut 76 for axially supporting the sleeve 72.

Figure 2:
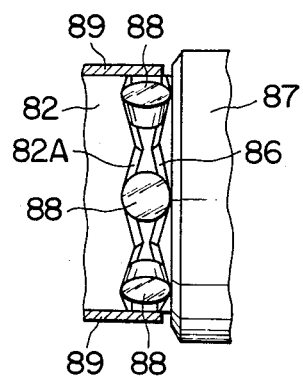
Fig. 2 is a front view of a cam mechanism.
Figure 3:
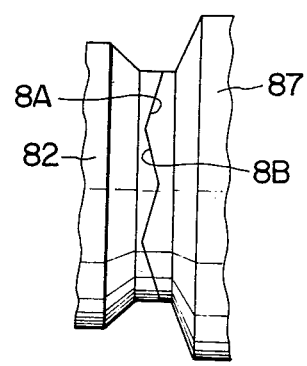
FIG. 3 is a front view of a cam mechanism of a different construction.

As shown in FIG. 2, the cam mechanism 8 is constituted by: a cam race 82 fixed in the axial direction by the stepped portion 131 of the input shaft 1 and a nut 17 threaded on the screw 15 at the end of the input shaft 1 and provided with a spline 81 on the inner periphery for engagement with the spline 14 on the input shaft 1; the other cam race 87; tapered rollers 88 interposed between the two cam races; and a cover ring 89 for the rollers 88. The tapered rollers 88 are held between operating surfaces 82A and 86 of the cam races 82 and 87 to vary the compressive force which urges the movable flange 3B rightward in the drawing, in response to displacements in the rotational direction of the input shaft 1 and stationary flange 3A. The cam mechanism may be of a different type, for example, a mechanism which employs ball bearings instead of the tapered rollers 88 or a mechanism which is arranged to abut inclined surfaces 8A and 8B directly as shown in FIG. 3.

The above-described V-belt type stepless transmission of the invention operates in the following manner.

(a) Brakes 63 and 73 both released in normal speed operation.

Figure 4:
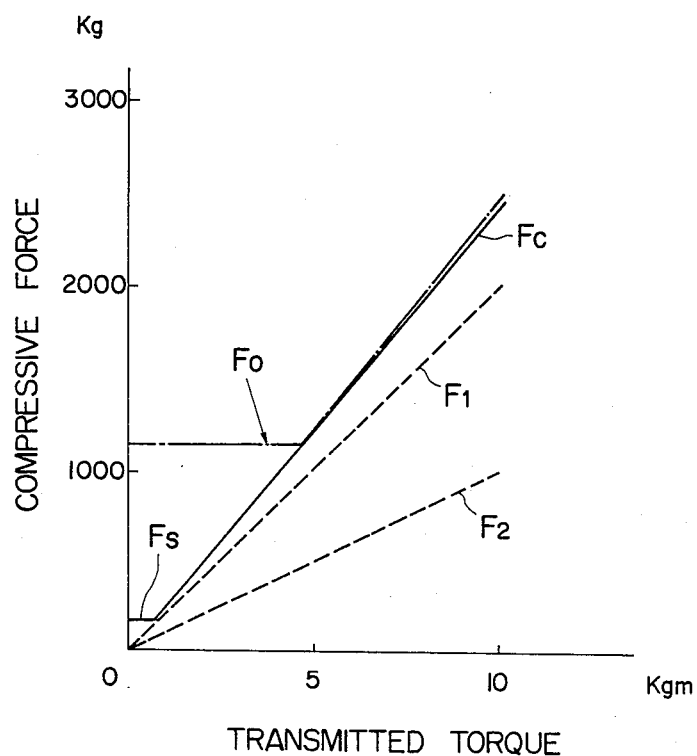
FIG. 4 is a diagram explanatory of operating principles of the cam mechanism.

The transfer of torque takes place in the following order: input shaft 1→one race 82 of cam mechanism→tapered rollers 88→the other race 87→input pulley 3→V-belt 5→output pulley 4→output shaft 2. The torque which is transmitted by the V-belt 5 is proportional to the compressive force which is imposed on the V-belt 5 and applied to the other cam race 87 through the movable pulley 3B and the sleeve 62 which is in threaded engagement with the movable pulley 3B, slightly moving the input pulley 3 in the rotational direction according to the principles of the cam mechanism 8. Accordingly, the axial compressive force Fc which is imposed by the tapered rollers 88 is varied in proportion to the transmitted torque as shown in FIG. 4, and therefore the compressive force acting on the movable flange 3B which grips the V-belt 5 is varied in proportion to the transmitted torque. Consequently, the surface pressure on the operating surfaces of the V-belt 5 and on the operating surfaces of the movable and stationary flanges 3B and 3A are varied to change the compressive force on the abutting surfaces. In FIG. 4, the reference character F1 indicates a compressive force which is required to prevent slips of the V-belt at a highest reduction ratio, F2 indicates a compressive force which is required to prevent slips of the V-belt at a lowest reduction ratio, and F0 indicates a compressive force imposed when a conventional hydraulic servo is used, and Fs indicates a compressive force imposed by the spring. It will be clearly seen from the graph of FIG. 4 that, in the V-belt stepless transmission of the invention using the cam mechanism 8, the compressive belt gripping force is varied in proportion to the transmitted torque even when the torque is lower than 5 kgm, so that it is possible to lessen generation of unnecessary large compressive forces on the contacting surfaces of the V-belt and pulleys.

(b) Upshift by engagement of brake 73.

The sleeves 62 and 72 are rotated relative to the sleeve portions 38 and 47 of the movable flanges, displacing the movable flange 3B in a direction of increasing the effective diameter of the input pulley 3 (rightward in the drawing) and displacing the movable flange 4B in a direction of minimizing the effective diameter of the output pulley (rightward in the drawing) to lower the reduction ratio. At the time point when the reduction ratio reaches a preset control value, the brakes 63 and 73 are released. At this time, the torsion spring 74 of the servo mechanism on the output pulley is twisted to charge energy.

(c) Downshift by engagement of brake 63.

Upon engaging the brake 63, the sleeve 62 is held stationary, so that the movable flange 3B is displaced in a direction of minimizing the effective diameter of the input pulley 3 (leftward in the drawing), while the torsion spring 74 returns, rotationally driving the sleeve 72 to displace the movable flange 4B in a direction of increasing the effective diameter of the output pulley 4 (leftward in the drawing). This displacement of the movable flange 3B of the input pulley 3 is effected against the pressing force of the cam mechanism 8 acting on the movable flange 3B. As soon as the reduction ratio reaches a preset control value, the brake 63 is released.

With this V-belt type stepless transmission, when it becomes difficult to engage brakes 63 and 73 due to a trouble of electromagnetic brakes, the transmission continually operates in a reduction ratio which was selected before occurrence of the trouble. Therefore, it is safe and the operation is completely free of an inadvertent change of reduction ratio as caused by leakage of oil pressure in the case of a V-belt transmission which is adapted to change the reduction ratio by a hydraulic servo.

Figure 5:
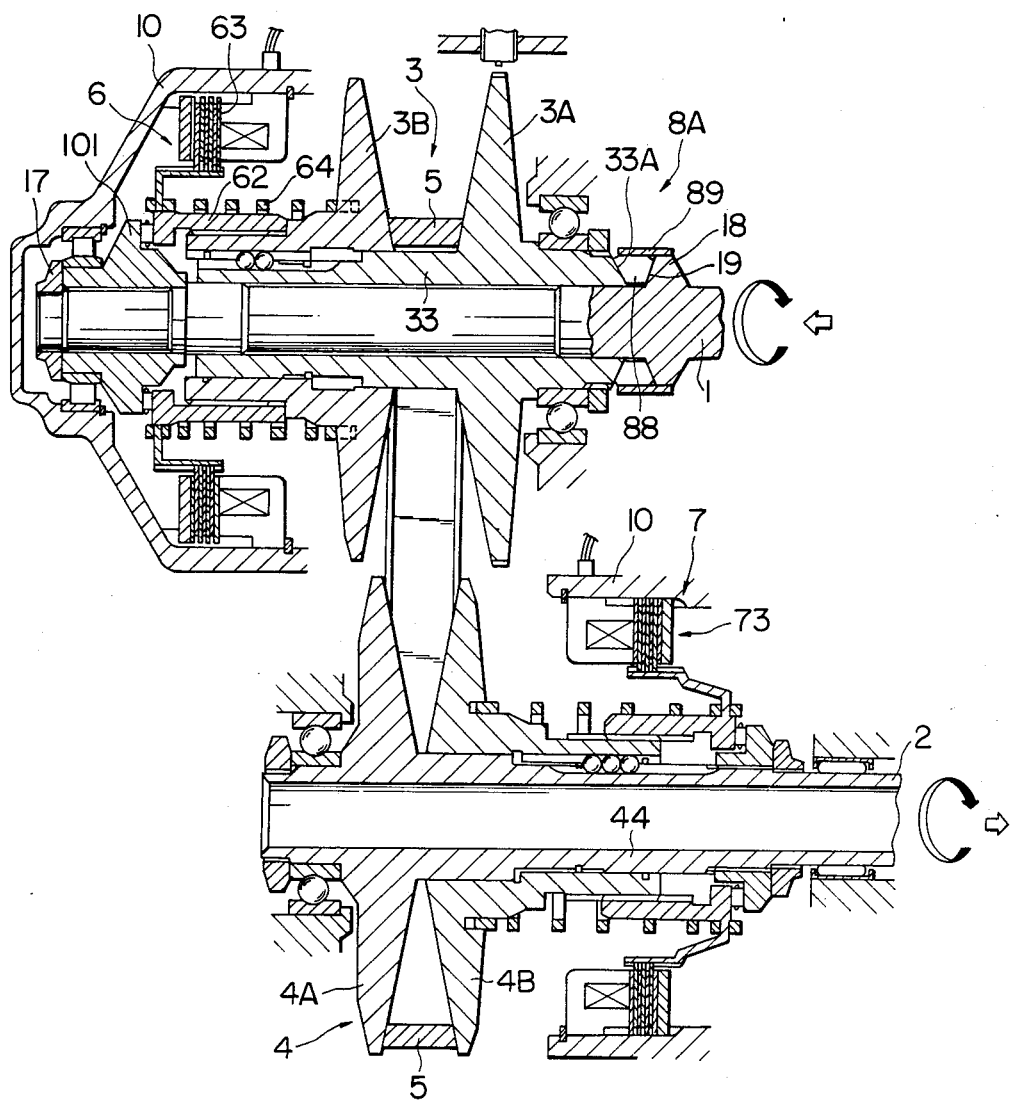
FIG. 5 is a view similar to FIG. 1 but showing a V-belt type stepless transmission in a second embodiment of the present invention.

Referring to FIG. 5, there is shown a second embodiment of the present invention, in which the cam mechanism 8 is located on the right side of the input pulley 3 on the input shaft 1 as seen in the drawing. The cam mechanism 8A has operating surfaces on a face 19 of a collar-like portion 18 on the side of the input pulley 3 and on an end face 33A of the sleeve 33 of the stationary flange 3A of the input pulley 3, for slightly moving the input shaft 1 in a direction away from the movable flange 3B to apply to the V-belt a compressive force corresponding to transmitted torque through a thrust bearing in cooperation with a stop ring 101 which is splined on the input shaft 1 and axially blocked by a nut 17.

Figure 6:
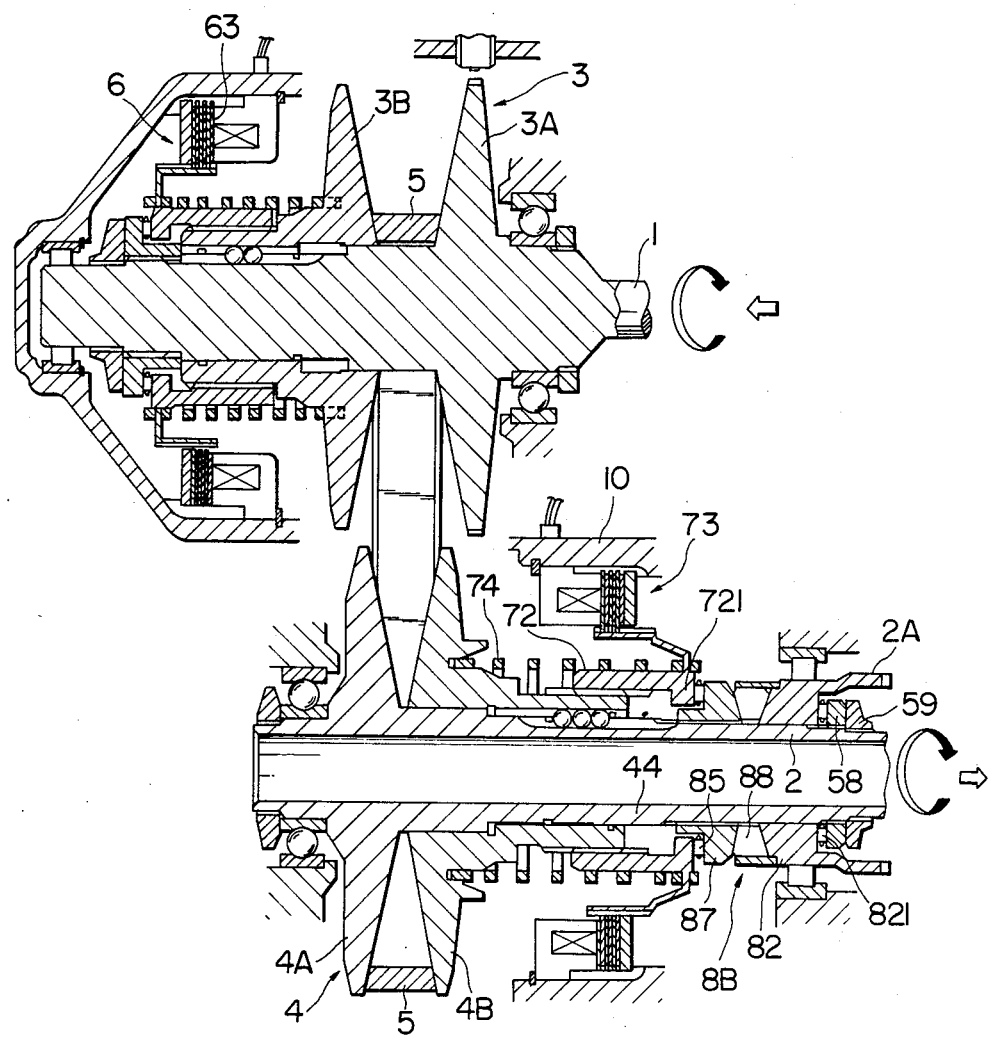
FIG. 6 is a view similar to FIG. 5 but showing a V-belt type stepless transmission in a third embodiment of the present invention.

Referring to FIG. 6, there is shown a third embodiment of the invention, which has a cam mechanism 8B provided on the output shaft 2. The cam mechanism 8B includes a first cam race 87 splined on a sleeve portion 44 of the stationary flange 4A of the output pulley 4 and abutted against an end face 721 of the sleeve 72 through a thrust bearing 85, a cam race 82 fitted on the sleeve 44 and stopped in position by a nut 59 threaded on the sleeve 44, through a support ring 58 splined on the sleeve 44 and a thrust bearing 821, and tapered rollers 88. In this embodiment, a rotary drum 2A which is formed integrally with the cam race 82 functions as an output shaft.

Figure 7:
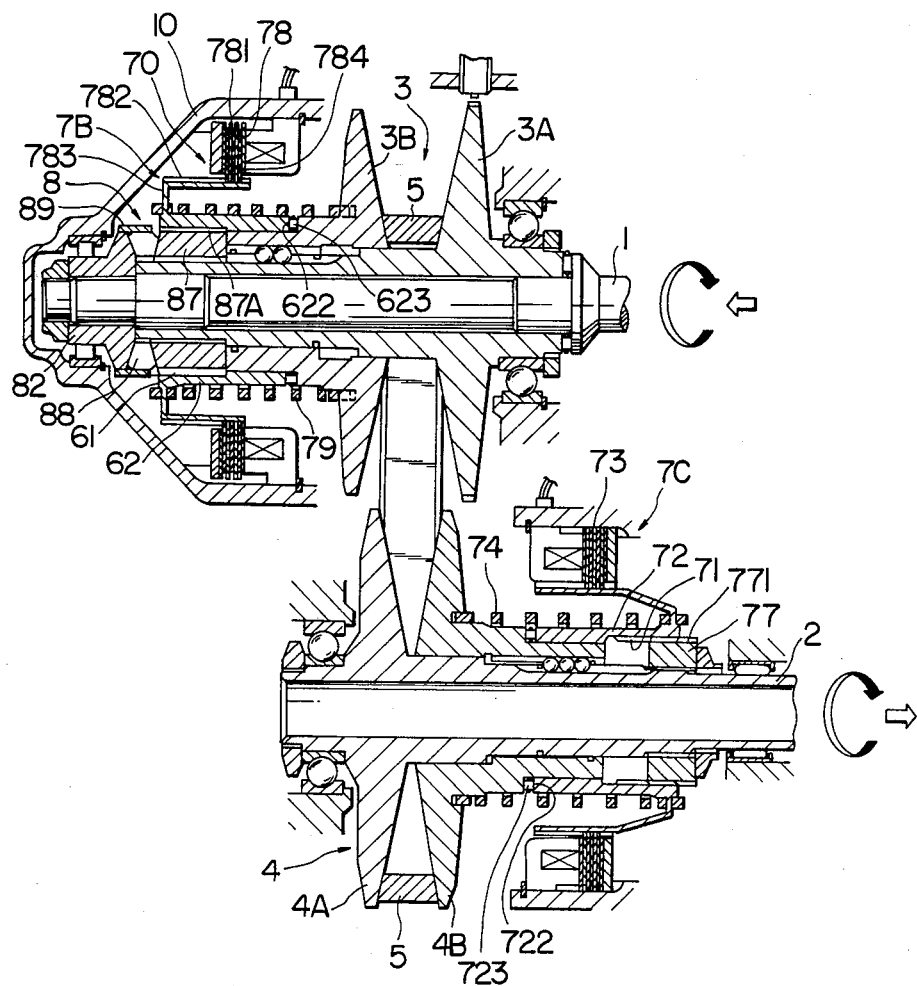
FIG. 7 is a view similar to FIG. 6 but showing a fourth embodiment of the present invention.

Referring to FIG. 7, there is shown a fourth embodiment of the invention, in which the servo mechanism 7B of the movable flange 3B of the input pulley 3 includes a downshift brake 78, an upshift torsion spring 79, a first or drive screw 87A formed on the outer periphery of the second cam race 87, a second or driven screw 61 formed on the inner periphery of the sleeve 62 and held in threaded engagement with the drive screw 87A, and a thrust bearing 623 interposed between the movable flange 3B and an end face 622 of the sleeve 62 on the side of the movable flange 3B. The downshift brake 78 which is provided between the sleeve 62 and the transmission case 10 includes brake plates 781 with frictional engaging portions 70 splined on the case 10, a hub drum 783 coupled with the sleeve 62 and provided with a spline 782 on the outer periphery thereof, and friction plates 784 disposed between the brake plates 781 and splined on the hub drum 783, permitting axial displacement of the sleeve 62. On the other hand, the servo mechanism 7C of the movable flange 4B of the output pulley 4 has a similar construction, and includes an upshift brake 73, a downshift spring 74, a sleeve 72 axially displaceable and having an end face 722 on the side of the movable flange 4B abutted thereagainst through a thrust bearing 723, and a support ring 77 having a first or drive screw 771 formed on the outer periphery thereof and engaged with a second driven screw 71 on the sleeve 72.

In this embodiment, when the downshift brake 78 or upshit brake 73 is engaged, the sleeve 62 or 72 which functions as a drive member is axially displaced to press the movable flange 3B or 4B.

As is clear from the foregoing description, the V-belt type stepless transmission according to the present invention comprises: an input pulley and an output pulley mounted on parallel input and output shafts, respectively, each pulley having a stationary flange and a movable flange axially displaceable relative to the stationary flange and rotatable integrally therewith; an endless V-belt lapped around the input and output pulleys to transmit power therebetween; a servo mechanism for the movable flange, including a drive member having a first screw or a second screw, the first screw formed on the movable flange or on a structure integrally connected to the movable flange, the second screw threadedly engaged with said first screw for axially displacing the movable flange by rotation of the second screw relative to the first screw, and a brake provided between the drive member and a transmission case for braking the drive member, and a torsion spring interposed between the movable flange and the drive member; and a cam mechanism provided at least on one of the input and output shafts to vary the belt gripping force of the stationary and movable flanges in proportion to the torque transmitted by the V-belt. Thus, it becomes possible to vary the frcitional force of the pulleys and V-belt in proportion to transmitted torque, thereby to improve the durability of pulleys and V-belt and to enhance the power transmission efficiency. Further, the servo mechanism employs a torsion spring for driving the movable flange in one direction, its construction can be simplified significantly as compared with a case where upshift and downshift are effected by separate brakes.

Although the invention has been described in terms of specific embodiments, it is to be understood that other forms of the invention may be readily adapted by those skilled in the art within the scope of the invention.

What is claimed is:

1. A V-belt type stepless transmission, comprising in combination:

an input pulley and an output pulley mounted on parallel input and output shafts, respectively, each pulley having a stationary flange and a movable flange axially displaceable relative to said stationary flange and rotatable integrally therewith;

an endless V-belt lapped around said input and output pulleys to transmit power therebetween;

a servo mechanism for said movable flange, including a drive member having a first screw or a second screw, the first screw formed on said movable flange or on a structure integrally connected to said movable flange, the second screw threadedly engaged with said first screw for axially displacing said movable flange by rotation of said second screw relative to said first screw, and a brake provided between said drive member and a transmission case for braking said drive member, and a torsion spring interposed between said movable flange and said drive member; and a cam mechanism carried on at least one of said input and output shafts to vary the belt gripping force of said stationary and movable flanges in proportion to the torque transmitted by said V-belt.

* * * * *